United States Patent [19]

Adams

[11] Patent Number: 5,498,120
[45] Date of Patent: Mar. 12, 1996

[54] MUD PAN APPARATUS

[76] Inventor: Daniel B. Adams, 3082 Cady Dr., Brighton, Mich. 48116

[21] Appl. No.: 363,531

[22] Filed: Dec. 23, 1994

[51] Int. Cl.$^6$ .................................................. B65G 19/02
[52] U.S. Cl. .......................... 414/528; 414/327; 414/288; 414/287; 414/403; 414/304; 198/550.12; 175/65; 175/207; 210/805
[58] Field of Search ........................................ 414/288, 287, 414/304, 306, 325, 327, 528, 403; 198/550.12; 175/65, 72, 207, 213, 216; 210/767, 800, 805, 190, 153

[56] References Cited

U.S. PATENT DOCUMENTS

| 897,942 | 9/1908 | Wangelin | 414/327 |
|---|---|---|---|
| 2,992,724 | 7/1961 | Berger . | |
| 3,071,238 | 1/1963 | Schreyer et al. . | |
| 4,212,383 | 7/1980 | Wagner | 198/616 |
| 4,848,535 | 7/1989 | Niemann | 198/550.12 |

*Primary Examiner*—Frank E. Werner
*Attorney, Agent, or Firm*—Gifford, Krass, Groh, Sprinkle, Patmore, Anderson & Citkowski

[57] ABSTRACT

A mud pan apparatus provided for use in combination with a well drilling device. The mud pan apparatus includes a housing having a bottom, opposed sidewalls and opposed end walls. Together, the bottom, sidewalls and end wall of the housing form a reservoir which is adapted to receive a slurry laden with earth deposits produced during the well drilling operation. A plurality of sprockets are rotatably mounted on opposite sidewalls of the housing and a chain that is provided around each set of sprockets. A plurality of space scrapers are secured to the chains so that the scrapers extend between the chains and thus across the bottom of the housing. A motor rotatably drives the pulleys which causes the scrapers to move along the bottom of the housing and up one side of the housing to thereby remove earth deposits from the housing and onto the ground.

7 Claims, 1 Drawing Sheet

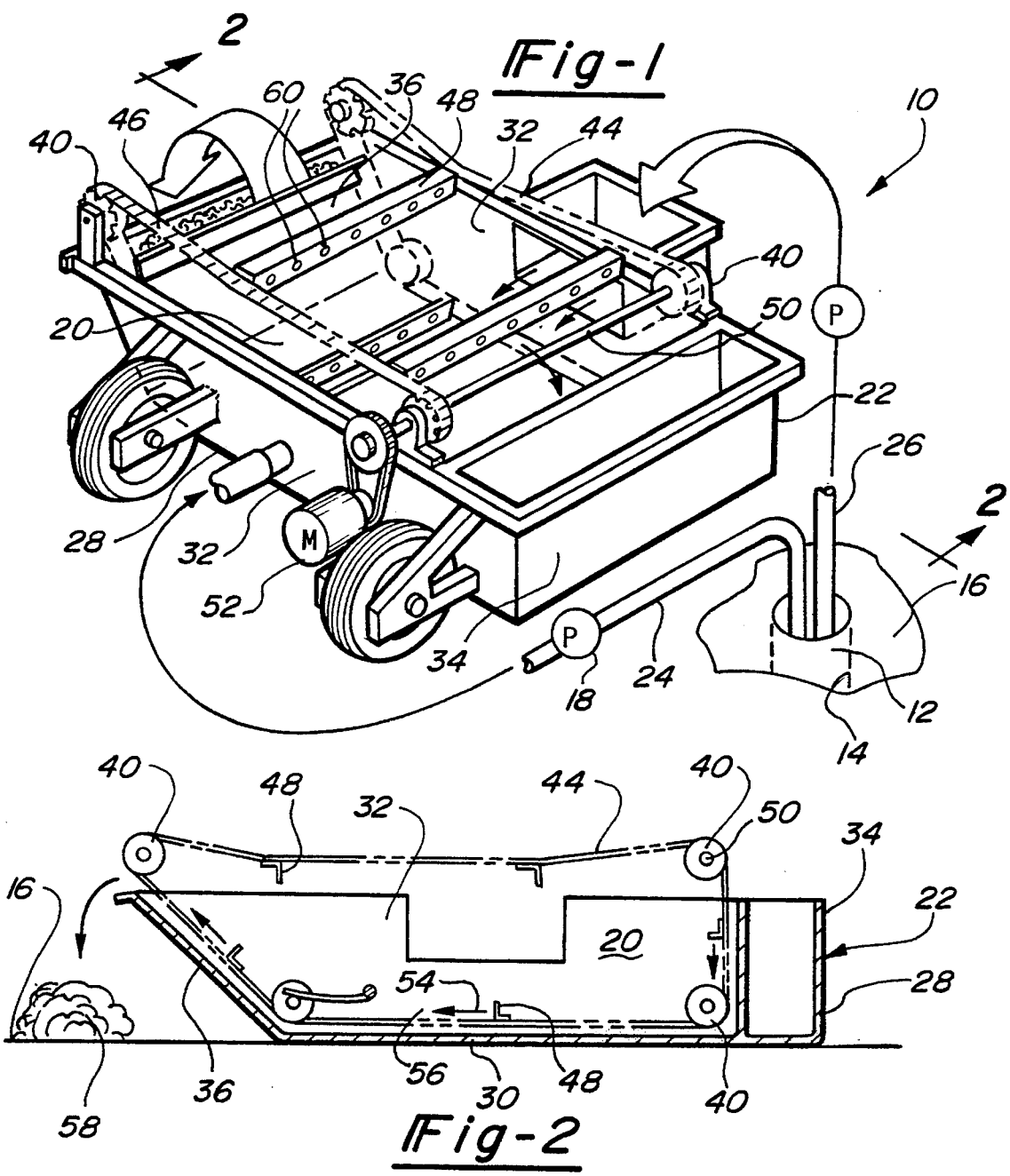

MUD PAN APPARATUS

BACKGROUND OF THE INVENTION

1. Field of the Invention

The present invention relates generally to well drilling devices and, more particularly, to a mud pan used in combination with well drilling devices.

2. Description of the Prior Art

When drilling wells, for example a well for a water supply, a drill bit is rotatably driven into the ground in a generally vertical direction until a source of water is found. In order to remove the earth from the well hole during the drilling process, a slurry is typically pumped into the well hole so that, as the slurry is removed, it entrains the earth deposits that are removed by the drill during the drilling process.

Additionally, in order to prevent the well hole from collapsing on itself during the drilling process, the slurry typically contains a polymer or bentonite which congeals and prevents the collapse of the sides of the well hole. These polymers or bentonite are typically mixed with water so that a mixture of water and polymer and/or bentonite is pumped into and thereafter removed from the well hole.

The polymers and/or bentonite that are added to water to form the slurry are relatively expensive. Furthermore, the slurry laden with earth deposits as removed from the well hole during the drilling operation is typically recaptured or recycled and again pumped into the well hole.

In order to recapture or recycle the usable slurry that is pumped out of the well hole, the slurry that is pumped out of the well hole is fed into a mud pan which forms a reservoir. The heavier earth deposits sink to the bottom of the mud pan thus leaving a cleaner and a reusable slurry near the top of the reservoir formed by the mud pan. A pump inlet is then fluidly connected to the reservoir near its top so that relatively clean slurry can then be again pumped by the pump into the well hole in the desired fashion.

One disadvantage of these previously known mud pans, however, is that, during the well drilling operation, the mud pan reservoir begins to fill with earth deposits from the drilling operation. Previously, it has been necessary for a worker to continuously shovel the earth deposits from the bottom of the mud pan and onto the ground. This labor intensive operation increases the overall cost of the well drilling operation.

SUMMARY OF THE PRESENT INVENTION

The present invention provides a mud pan apparatus which overcomes all of the previously known disadvantages of the previously known devices.

In brief, the present invention provides a mud pan apparatus having a housing with a bottom, opposed sidewalls and opposed end walls. Together, the bottom, sidewalls and end walls form a reservoir which is adapted to receive the slurry laden with earth deposits from the well hole. A pump inlet is fluidly connected to the reservoir near its top so that relatively clean slurry is again pumped into the well hole and ultimately returned to the housing reservoir laden with earth deposits.

In order to remove the earth deposits from the bottom of the housing reservoir, the present invention provides a pair of spaced apart endless chains which are rotatably secured to opposite sidewalls of the housing so that the chains are parallel and spaced apart from each other. A plurality of scrapers are then secured between the chains at spaced intervals therealong so that at least some of the scrapers extend along the bottom of the housing.

A motor is then drivingly connected to one of the chains so that, upon actuation of the motor, the chain is rotatably driven along its sprockets. In doing so, the scrapers are moved longitudinally along the bottom of the housing and up along one side of the housing.

In practice, the scrapers engage earth deposits collected near the bottom of the reservoir and move these earth deposits along the bottom of the reservoir, up along one side of the reservoir and dump these earth deposits out one end of the mud pan housing and onto the ground. When the pile of earth removed from the mud pan becomes too high, the mud pan is simply moved a few feet and the above process is repeated.

Since removal of the earth deposits from the mud pan is automated, the present invention eliminates the previously known need of manually removing the earth deposits from the mud pan.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view of a preferred embodiment of the present invention; and FIG. 2 is a sectional view taken substantially along line 2—2 in FIG. 1 and illustrating the operation of the present invention.

DESCRIPTION OF A PREFERRED EMBODIMENT OF THE PRESENT INVENTION

With reference first to FIG. 1, a well drilling apparatus 10 is thereshown diagrammatically and includes a well drill 12 which drills a well hole 14 into the ground 16. In forming the hole, the drill 12 necessarily removes earth, rocks, stones, and other debris, hereinafter collectively referred to as earth deposits, from the ground 16.

In order to remove the earth deposits from the well hole 14, a pump 18 pumps a slurry from a reservoir 20 formed by a mud pan 22 into the well hole 16 via line 24. Once fresh slurry is pumped into the well hole 14, slurry laden with earth deposits within the well hole is simultaneously pumped out of the well hole 14 along fluid line 26 back to the reservoir 20. Earth deposits contained within the slurry and which are returned to the reservoir 20 gravitate towards the bottom of the reservoir 20 due to their weight.

With reference now to FIGS. 1 and 2 the mud pan 22 is thereshown in greater detail and comprises a housing 28 having a bottom wall 30, opposed sidewalls 32 and opposed end walls 34 and 36. Furthermore, the end wall 36 extends upwardly and outwardly from the bottom wall 30 at an oblique angle. The housing 22 can be constructed of any conventional material, but preferably is constructed of steel.

A plurality of sprockets 40 are rotatably mounted to each sidewall 32 so that the sprockets 40 on one side wall 32 are spaced apart and parallel to the sprockets 40 on the other sidewall 32. A first endless chain 44 mounted around the sprockets 40 on one sidewall 32 while, similarly, a second endless chain 46 (FIG. 1) is mounted around the sprockets 40 of the other sidewall 32. Consequently, the chains 44 and 46 are spaced apart and parallel from each other.

Still referring to FIGS. 1 and 2, a plurality of elongated and generally rectangular scrapers 48 are secured between the endless chains 44 and 46 so that the scrapers 48 are longitudinally spaced apart from each other along the chains 44 and 46. Furthermore, as best shown in FIG. 2, the scrapers 48 along the lower portion of the endless chains 44 and 46 are positioned closely adjacent and generally perpendicular to the bottom 30 of the housing 28.

A drive axle 50 extends between at least two registering sprockets 40 on opposite sidewalls 32. A motor 52 (FIG. 1) rotatably drives one sprocket 40 so that the chains 44 and 46 move in unison with each other.

Referring now particularly to FIG. 2, activation of the motor 52 causes the chains 44 and 46 to move in the direction of arrow 54 along with the attached scrapers 48. In doing so, the scrapers 48 contact earth deposits 56 that have accumulated along the bottom 30 of the reservoir 20 and move the earth deposits 56 in the direction of arrow 54. The scrapers 48 thus scrape the earth deposits from the bottom of the reservoir 20 and move these earth deposits 56 up along the angled end wall 36 of the housing 28 and onto the ground 16 as shown at 58. In doing so, the scrapers 48 driven by the motor 52 continuously remove the earth deposits 56 from the reservoir 20 and dump these earth deposits 56 outside of the reservoir 20 in the desired fashion.

As best shown in FIG. 1, the scrapers 48 also preferably have drainage holes 60 formed along their length. These drainage holes 60 allow the clean slurry to seep back into the reservoir 20 during the emptying operation so that only a minimal amount of reusable slurry is removed from the reservoir 20 by the scrapers 48.

From the foregoing, it can be seen that the present invention provides an improved mud pan apparatus which overcomes the disadvantages of the previously known devices. Having described my invention, however, many modifications thereto will become apparent to those skilled in the an to which it pertains without deviation from the spirit of the invention as defined by the scope of the appended claims.

I claim:

1. In combination with a mud pan apparatus a well drilling apparatus for drilling a well hole comprising:

a housing having a bottom, opposed sidewalls and opposed end walls which, together, define a reservoir, said reservoir having an inlet adapted to receive slurry laden with earth deposits via means from the well hole and a fluid outlet for recycling the slurry, via second means back to the well hole, means attached to said housing for automatically removing the earth deposits from the bottom of said housing, wherein said removing means comprises a pair of endless members, means for movably mounting said endless members to said opposed sidewalls of said housing so that said endless members are spaced apart and parallel to each other, a plurality of scrapers secured between said endless members at spaced intervals therealong, means for movably driving said endless members so that said scrapers engage the earth deposits along the bottom of said housing and dump the earth deposits exteriorly of said housing adjacent one of said housing end walls.

2. The invention as defined in claim 1 wherein said housing has an open top.

3. The invention as defined in claim 1 wherein said scrapers and said mounting means are dimensioned such that a bottom of said scrapers moves closely along said bottom of said housing as said endless members are driven by said driving means.

4. The invention as defined in claim 1 wherein said one end wall of said housing extends upwardly and outwardly from said bottom wall at an oblique angle.

5. The invention as defined in claim 1 wherein each said endless member is a closed loop chain.

6. The invention as defined in claim 1 wherein each scraper is rectangular in shape.

7. The invention as defined in claim 1 wherein at least one scraper has at least one drainage hole formed through it.

* * * * *